US012565549B2

(12) United States Patent
Moman et al.

(10) Patent No.: US 12,565,549 B2
(45) **Date of Patent: *Mar. 3, 2026**

(54) PROCESS TO PREPARE A PROCATALYST FOR POLYMERIZATION OF OLEFINS

(71) Applicant: SABIC GLOBAL TECHNOLOGIES B.V., Bergen Op Zoom (NL)

(72) Inventors: Akhlaq Moman, Riyadh (SA); Vladimir Aleksandrovich Zakharov, Novosibirsk (RU); Sergei Andreevich Sergeev, Novosibirsk (RU); Artem Barabanov, Novosibirsk (RU)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 801 days.

This patent is subject to a terminal disclaimer.

(21) Appl. No.: 17/778,694

(22) PCT Filed: Nov. 5, 2020

(86) PCT No.: PCT/EP2020/081134

§ 371 (c)(1),
(2) Date: May 20, 2022

(87) PCT Pub. No.: WO2021/099134

PCT Pub. Date: May 27, 2021

(65) Prior Publication Data

US 2023/0021046 A1 Jan. 19, 2023

(30) Foreign Application Priority Data

Nov. 22, 2019 (EP) .................................... 19210805

(51) Int. Cl.

*C08F 110/06* (2006.01)
*C08F 4/651* (2006.01)
*C08F 4/656* (2006.01)

(52) U.S. Cl.

CPC ............ *C08F 110/06* (2013.01); *C08F 4/651* (2013.01); *C08F 4/656* (2013.01)

(58) Field of Classification Search

None

See application file for complete search history.

(56) References Cited

U.S. PATENT DOCUMENTS

| | | | |
|---|---|---|---|
| 6,799,568 | B2 | 10/2004 | Zakharov et al. |
| 2020/0048378 | A1 | 2/2020 | Moman et al. |

FOREIGN PATENT DOCUMENTS

| | | | | |
|---|---|---|---|---|
| EP | 1538167 | A1 | 6/2005 | |
| EP | 1783145 | A1 | 5/2007 | |
| EP | 2027164 | B1 | 8/2012 | |
| EP | 3519458 | B1 * | 8/2023 | ............ C08F 110/06 |
| WO | 9632427 | A1 | 10/1996 | |
| WO | 2014001257 | A1 | 1/2014 | |
| WO | 2015091983 | A1 | 6/2015 | |
| WO | 2015091984 | A1 | 6/2015 | |
| WO | 2015185489 | A1 | 12/2015 | |
| WO | 2018059955 | A1 | 4/2018 | |

OTHER PUBLICATIONS

International Search Report for International Application PCT/EP2020/081134, International Filing Date Nov. 5, 2020, Date of Mailing Feb. 5, 2021, 5 pages.

Pasquini, N (ed.) "Polypropylene handbook," Carl Hanser Verlag Munich; 2005, 11 Pages, 2nd edition, Chapter 6.2.

Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.

Written Opinion for International Application PCT/EP2020/081134, International Filing Date Nov. 5, 2020, Date of Mailing Feb. 5, 2021, 7 pages.

* cited by examiner

*Primary Examiner* — Catherine S Branch

(74) *Attorney, Agent, or Firm* — CANTOR COLBURN LLP

(57) ABSTRACT

The present invention relates to a process for the preparation of a procatalyst suitable for preparing a catalyst composition for olefin polymerization, said process comprising the steps of: Step A) providing or preparing a Grignard compound; Step B) contacting the Grignard compound with a silane compound to give a solid support; Step C) activating said solid support, comprising two sub steps: Step C1) contacting the solid support obtained in step B) with at least one first activating compound and a second activating compound; and Step C2) a second activation step by contacting the partly activated solid support obtained in step C1) with an activating electron donor; to obtain an activated solid support; Step D) reacting the activated solid support obtained in step C) with a halogen-containing Ti compound, optionally an activator and at least one internal electron donor in several sub steps to obtain said procatalyst. The invention moreover relates to a procatalyst, a catalytic system comprising said procatalyst and to a process to prepare polyolefins using said catalyst system and the polyolefins obtained therewith.

15 Claims, No Drawings

PROCESS TO PREPARE A PROCATALYST FOR POLYMERIZATION OF OLEFINS

CROSS REFERENCE TO RELATED APPLICATIONS

This application is a National Stage application of PCT/EP2020/081134, filed Nov. 5, 2020, which claims the benefit of European Application No. 19210805.8, filed Nov. 22, 2019, both of which are incorporated by reference in their entirety herein.

BACKGROUND

The present invention relates to an improved process to prepare a procatalyst that is suitable for use in a catalyst system for polymerization of olefins. The invention also relates to said procatalyst obtained and a catalyst system comprising said procatalyst. In addition, the invention is related to a process of making polyolefins by contacting at least one olefin with said catalyst system. Moreover, the present invention relates to polymers obtained by polymerization using said procatalyst and to the shaped articles of said polymers. The invention also relates to the use of toluene as a dispersant (and/or solvent) during the process to prepare a procatalyst.

Ziegler-Natta catalyst systems and their components that are suitable for preparing a polyolefin are generally known. An overview of such catalyst types is for example given by T. Pullukat and R. Hoff in Catal. Rev.-Sci. Eng. 41, vol. 3 and 4, 389-438, 1999. The preparation of such a procatalyst is for example disclosed in WO96/32427 A1.

It is an object of the invention to provide an improved process for a procatalyst for polymerization of olefins, especially with improved environmental friendliness and decreased costs but while keeping excellent performance.

SUMMARY

At least one of the aforementioned objects of the present invention is achieved with the several aspects discussed below.

The present invention relates in a first aspect to a process for the preparation of a procatalyst suitable for preparing a catalyst composition for olefin polymerization, said process comprising the steps of: Step A) providing or preparing a Grignard compound; Step B) contacting the Grignard compound with a silane compound to give a solid support; Step C) activating said solid support either in a single activation step or in a double activation step to obtain an activated solid support; and Step D) reacting the activated solid support obtained step C) with a halogen-containing Ti compound, optionally an activator, and at least one internal electron donor to obtain said procatalyst.

Another aspect of the present invention, is a procatalyst directly obtained by the process according to the invention. Another aspect of the present invention, is a process for the preparation of polyolefins, preferably polypropylene, comprising the contacting of a procatalyst with an olefin, and optionally an external donor and/or optionally a co-catalyst or contacting a catalyst system—comprising a procatalyst, an external donor and a co-catalyst, with an olefin. Another aspect of the present invention, is a polyolefin, preferably a polypropylene, obtainable by said process. Another aspect is a shaped article. Another aspect is the use of toluene in the process to prepare the procatalyst. These above aspects and well as several embodiments thereof will be described in more detail below.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprising catalytic species supported on a metal or metalloid compound (e.g. a magnesium compound or a silica compound).

"catalytic species" as used in the present description means: a transition metal-containing species comprising a transition metal halide selected from titanium halide, chromium halide, hafnium halide, zirconium halide and vanadium halide.

"internal donor" or "internal electron donor" as used in the present description means: an electron-donating compound containing one or more atoms of oxygen (O) and/or nitrogen (N).

"external donor" or "external electron donor" as used in the present description means: an electron-donating compound used as a reactant in the polymerization of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst and is added prior to or simultaneous with the addition of an internal donor.

"activating compound" as used in the present description means: a compound used to activate the solid support prior to contacting said solid support with the catalytic species.

"procatalyst" as used in the present description means: a component of a catalyst composition generally comprising an activated solid support, a transition metal-containing catalytic species, and one or more internal donors.

"halide" or "halogen" as used in the present description means: an ion selected from the group of: fluoride ($F^-$), chloride ($Cl^-$), bromide ($Br^-$) and/or iodide ($I^-$).

"heteroatom" as used in the present description means: an atom other than carbon or hydrogen.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radicals, as well as combinations thereof, such as alkaryl and aralkyl. A hydrocarbyl group may be substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be unsubstituted or substituted.

"aryl" as used in the present description means: an aryl group being a functional group or side-chain derived from an aromatic ring. An aryl group and may be unsubstituted or substituted with straight or branched hydrocarbyl groups.

"alkoxide" or "alkoxy" as used in the present description means: a functional group or sidechain obtained from an alkyl alcohol. It consists of an alkyl bonded to a negatively charged oxygen atom.

"aryloxide" or "aryloxy" or "phenoxide" as used in the present description means: a functional group or sidechain obtained from an aryl alcohol. It consists of an aryl bonded to a negatively charged oxygen atom.

"Grignard reagent" or "Grignard compound" as used in the present description means: a compound or a mixture of compounds of formula $R^4{}_zMgX^4{}_{2-z}$ ($R^4$, z, and $X^4$ are as defined below under "Phase I") or it may be a complex having more Mg clusters, e.g. $R^4Mg_3Cl_2$.

"bulk density" or "BD" as used in the present description means: the weight per unit volume of a material, including voids inherent in the material as tested. Bulk density is measured as apparent density according to ASTM D1895-96 Reapproved 2010-e1, test method A.

"XS" or "xylene soluble fraction" as used in the present description means: the weight percentage (wt. %) of soluble xylene in the isolated polymer, measured according to ASTM D 5492-10.

"yield" as used in the present description means: the amount of kilograms of polymer produced (product rate) per gram of procatalyst consumed in the polymerization reaction per hour.

"MFR" or "Melt Flow rate" as used in the present description is measured at a temperature of 230° C. with 2.16 kg load and measured according to ISO 1133:2005.

Unless stated otherwise, when it is stated that any R group is "independently selected from" this means that when several of the same R groups are present in a molecule they may have the same meaning or they may not have the same meaning. The present invention is described below in more detail. All embodiments described with respect to one aspect of the present invention are also applicable to the other aspects of the invention, unless otherwise stated.

DETAILED DESCRIPTION OF EMBODIMENTS

It has been surprisingly found that the properties of the procatalyst can be improved by an improved method according to the first aspect of the present invention using toluene as the dispersant (and/or solvent) in step D of the process. An advantage of the present invention, using toluene in step D of the process, is that higher internal donor incorporation is obtained. Another advantage is the increased MFR of the polyolefin obtained.

As stated above, the first aspect of the invention relates to a multistep process comprising steps A), B), C) and D) as disclosed in the claims. Each of these steps is disclosed in more detail below.

The invention also relates to the use of toluene as a dispersant (and/or solvent) in a process for preparing a procatalyst for polymerization of olefins, said process comprising contacting a magnesium-containing support with a halogen-containing titanium compound, and an internal electron donor and said toluene as dispersant (and/or solvent) for increasing the incorporation content of internal electron donor into the procatalyst.

The invention also relates to the use of toluene as a dispersant (and/or solvent) in a process for preparing a procatalyst for polymerization of olefins, said process comprising contacting a magnesium-containing support with a halogen-containing titanium compound, an activator, an internal electron donor and said toluene as dispersant (and/or solvent) for increasing the incorporation content of said activator and optionally for increasing the incorporation content said internal electron donor into the procatalyst.

In an embodiment, the procatalyst is obtained by the process that is similar to the process as described in EP2027164 B1, except for the use of toluene in step D). Example I of EP2027164 B1 including all sub-examples (IA-IE) is incorporated into the present description. More details about the different embodiments are disclosed starting in paragraphs [0016] to [0089] of EP2027164 B1. All these embodiments related to the process and products are incorporated by reference into the present description. In the following part of the description the different steps and phases of the process for preparing the procatalyst according to the present invention will be discussed. All of these embodiments of the process are also related to the uses above.

The process for preparing a procatalyst according to the present invention comprises the following phases and steps

- phase I): preparing a solid support for the procatalyst (Step A) and Step B));
- phase II): activating said solid support obtained in phase I using either a single step activation or using a double step activation with at least two activating steps both using at least two activating compounds to obtain an activated solid support (Step C));
- phase III): contacting said activated solid support obtained in phase II with a catalytic species, optionally an activator, and at least one internal donor (Step D)).

Optionally, there may be a modification step with a modifier that disclosed in EP2027164 B1 as phase IV and is incorporated in this description.

The procatalyst thus prepared can be used in polymerization of olefins using e.g. an external electron donor and a co-catalyst. The various steps used to prepare the catalyst according to the present invention are described in more detail below.

Phase I: Preparing a Solid Support for the Catalyst

This phase I comprises step A) being the provision or preparation of a Grignard reagent and step B) of reacting the Grignard reagent with a silane compound.

Step A) may include the provision of a previously prepared or commercially obtained Grignard reagent or may include the preparation of a Grignard reagent. Said Grignard reagent that is provided or prepared in step A) is a compound $R^4{}_zMgX^4{}_{2-z}$. $R^4$ is independently selected from linear, branched, or cyclic hydrocarbyl groups independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl, more preferably butyl. $X^4$ is independently selected from the group consisting of fluoride ($F^-$), chloride ($Cl^-$), bromide ($Br^-$) or iodide ($I^-$), preferably chloride. z is in a range of larger than 0 and smaller than 2, being $0<z<2$. For example $R^4{}_zMgX^4{}_{2-z}$ is n-butyl magnesium chloride or phenyl magnesium chloride wherein $R^4$ is respectively n-butyl or phenyl, z=1 and X=Cl. Step A) including many embodiments, is described in detail in WO2015091984 A1 of the same applicant, page 15, line 14 to page 16, line 28, which complete section is incorporated here by reference.

Step B) includes contacting the compound $R^4{}_zMgX^4{}_{2-z}$ (defined above for step A)) with a silane compound $Si(OR^5)_{4-n}(R^6)_n$ to give a solid support $Mg(OR^1)_xX^1{}_{2-x}$ wherein $R^1$, $R^5$ and $R^6$ are each independently selected from linear, branched or cyclic hydrocarbyl groups independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^1$ is independently selected from the group of consisting of fluoride ($F^-$), chloride ($Cl^-$), bromide ($Br^-$) or iodide ($I^-$), preferably chloride; n is in range of 0 to 4, preferably n is from 0 up to and including 1; x is in a range of larger than 0 and smaller than 2, being $0<x<2$. Preferably tetraethoxysilane (TES; $R^5$=ethyl, n=0) is used during step B) as the silane compound to provide a compound of formula $Mg(OR^1)_xX^1{}_{2-x}$ wherein $R^1$ is ethyl (Et) and $X^1$ is Cl. Step B), including many embodiments, is described in detail in WO2015091984 A1 on page 16 line, 30 to page 22, line 25, which complete section is incorporated here by reference.

Phase II: Activating Said Solid Support for the Catalyst (Step C)

This phase comprises either one step (step C)) or comprises two sub steps (steps C1) and C2)).

Step C) and step C1) are very similar and each includes contacting the solid support obtained in step B) with at least one activating compound being a metal(loid) alkoxide compound of formula $M^1(OR^2)_{v-w}(OR^3)_w$ or $M^2(OR^2)_{v-w}(R^3)_w$, to obtain a partly activated reaction product; wherein: $M^1$ is a metal (or a metalloid) selected from the group consisting of Ti, Zr, Hf, Al and Si; $M^2$ is Si (a metalloid); v is the valency of $M^1$ or $M^2$ and w is smaller than v; v for example being 3 or 4 and w for example being 0, 1, or 2; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms. A second activating compound is used, being an activating electron donor. It should be noted that in case this phase comprises two sub steps, step C1) may comprise the contacting of the solid support with firstly the first activating compound (e.g. TET) and thereafter with the second activating compound (e.g. EtOH); it may comprise contacting the solid support firstly with the second activating compound (e.g. EtOH) and thereafter with the first activating compound (e.g. TET). More preferably as activating electron donor an alcohol is used, such as methanol or ethanol, ethanol being more preferred. A process disclosing an activation with one single activating compound being either an activating electron donor or a metal alkoxide is described in detail in WO2015091984 A1 of the same applicant, page 23 line 3 to page 28, line 14, which complete section is incorporated here by reference.

Step C2) relates to a second activation using an activating electron donor, preferably an alcohol, more preferably methanol, ethanol, or propanol, most preferably ethanol. Ethanol is preferred over methanol in view of the relatively high toxicity of methanol. The activating electron donor used in step C2) may, in an embodiment, be the same as the activating electron donor used in step C1).

In an embodiment, step C1) comprises a first activation step using an activating electron donor, preferably methanol or ethanol, most preferred ethanol; and a metal alkoxide compound of formula $M^1(OR^2)_{v-w}(OR^3)_w$ preferably titanium tetraethoxide (TET); and step C2) comprises a second activation step carried out using an activating electron donor, preferably ethanol. In a specific embodiments step C1) uses TET and ethanol and step C2) uses ethanol. More information about the double activation as well as activating compounds can be found in WO2018/059955 A1 of which the sections "activating metal alkoxide compound" (page 10, lines 10-34), "activating electron donors" (page 11, lines 1-17) and "Conditions during step C) (for both C1) and C2))" (page 11, line 19 to page 12, line 5) are incorporated by reference into the present description.

Phase III: Preparing the Procatalyst

Step D) involves reacting the activated solid support obtained in step C) (which might be a single activated or double activated support) with a halogen-containing Ti compound, optionally an activator and at least one internal electron donor, preferably in several sub steps or stages. The present invention is related to the use of toluene during this step D). For step D) the halogen-containing Ti compound is mixed with toluene (preferably in a volume ratio of 1:2 to 2:1, such as 1:1.5 to 1.5:1, e.g. 1:1) prior to addition to the activated solid support. In addition, the internal donor and optionally activator are preferably also added as a solution in toluene to the activated solid support.

Step D) may comprise several stages (e.g. I, II and III and optionally IV). During each of these consecutive stages the activated solid support is contacted with at least a catalytic species in toluene. In other words, the addition or reaction of said catalytic species may be repeated one or more times. Preferably, the same catalytic species is used in each stage. Preferably titanium tetrachloride ($TiCl_4$) is used as catalytic species in all stages of step D). The catalyst species may be added first followed by addition of an activator and/or internal electron donor in any of the stages.

In an embodiment, said sub steps or stages comprise:

D-I) in a first stage (stage I): contacting the activated solid support obtained in step C) with a halogen-containing Ti compound in toluene, optionally an activator and optionally (a portion of) an internal donor in toluene;

D-II) in a second stage (stage II): contacting the product obtained in step D-I) with a halogen-containing Ti compound in toluene, optionally an activator and optionally (a portion of) an internal electron donor in toluene;

D-III) in a third stage (stage III): contacting the product obtained in step D-II) with a halogen-containing Ti compound in toluene, optionally an activator and optionally (a portion of) an internal electron donor in toluene;

D-IV) optionally in a fourth stage (stage IV): contacting the product obtained in step D-III) with a halogen-containing Ti compound in toluene, optionally an activator and optionally (a portion of) an internal electron donor in toluene;

wherein said internal electron donor is added during at least one of the stages D-I, D-II, D-III, and D-IV to obtain said procatalyst.

This phase D) (also called phase III) is described in detail in WO2015091984 A1 of the same applicant, page 28, line 15 to page 31, line 13, which complete section is incorporated here by reference. Moreover, specific embodiments regarding temperature and time in phase D are incorporated here by reference from page 13, lines 10-25 of WO2018/059955 A1.

Without wishing to be bound by any theory, the inventors believe that an activator has as main purpose to increase catalyst productivity (an activator may be added in any of the stages); whereas the internal donor has as main purpose to control product stereospecificity, namely xylene solubles.

Catalytic Species

Step D) involves, in all sub steps reacting the activated solid support with a transition metal halide (e.g. titanium halide, chromium halide, hafnium halide, zirconium halide, vanadium halide) but preferably titanium halide, e.g. $TiX_4$ wherein X is chloride or fluoride, preferably chloride. Step D) (also called step iii)) is described in detail in WO2015091984 A1 page 29, line 28 to page 31, line 13, which complete section is incorporated here by reference.

Activator

An activator may be added during step D). The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5. In an embodiment, an activator is present during this step D).

Several types of activators can be used, such as benzamide, alkylbenzoates, and monoesters. Each of these will be discussed below.

A benzamide activator has a structure as disclosed in WO2015091983 A1 of the same applicant, page 13, line 13 to page 14, line 37, which complete section is incorporated here by reference.

A benzamide may according to formula X:

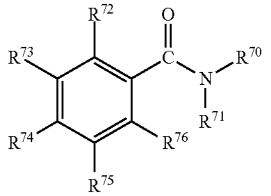

wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof, preferably benzamide (BA or BA-2H, $R^{70}$ to $R^{76}$=H), N-methyl benzamide (BA-HMe, $R^{70}$=Me, $R^{71}$ to $R^{76}$=H) or N,N-dimethyl benzamide (BA-2Me, $R^{70}$, $R^{71}$=Me and $R^{72}$ to $R^{76}$=H). Suitable non-limiting examples of "benzamides" include benzamide (BA-2H), methylbenzamide (BA-HMe) or N,N-dimethylbenzamide (BA-2Me).

A detailed description of regarding the use of mono-esters as activators is to be found in WO2015091984 A1 of the same applicant, page 42, line 12 to page 43, line 24, which section is incorporated here by reference. A detailed description of regarding the use of alkylbenzoates as activators is to be found in WO2015091984 A1 of the same applicant, page 42, lines 1-12, which section is incorporated here by reference. The activator is for example ethyl benzoate (EB).

Internal Electron Donors

At least one internal electron donor is added during step D). Also mixtures of internal electron donors can be used. Examples of internal electron donors are disclosed below. The molar ratio of the internal electron donor relative to the magnesium may vary between wide limits, for instance from 0.01 to 0.75. Preferably, this molar ratio is from 0.02 to 0.5; more preferably from 0.03 to 0.3. The internal donor may be added in one single portion during one of the stages I, II, III or IV. The internal donor may also be added in split portions, e.g. in two portions or in three portions or even more. When the internal donor is added in two portions it may for example be added in Stage I and II or in stage II and III. When the internal donor is added in three portions, it may for example be added in stages I, II and III or in stages II, III and IV. More information regarding this can be found in the section on internal donors of WO2018/059955, page 15, line 18 to page 21, line 32 which section is incorporated in this description.

In an embodiment, as internal donor 4-[(ethoxycarbonyl)(methyl)amino]pentan-2-yl ethyl carbamate (AB-OEt). More information about this internal electron donor an several embodiments can be found in in WO2015/185489 which is incorporated by reference into the present application. The preparation of this donor is disclosed in WO2015/185489, Example A which is incorporated by reference into the present application. In an embodiment, the internal donor is a carbonate-carbamate compound according to Formula A:

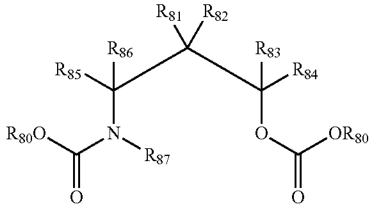

wherein: $R^{81}$, $R^{82}$, $R^{83}$, $R^{84}$, $R^{85}$, and $R^{86}$ are the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{87}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; each $R^{80}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^{80}$ is preferably selected from the group consisting of alkyl having 1 to 30 carbon atoms, preferably 1 to 20 carbon atoms, more preferably 1 to 6 carbon atoms, even more preferably methyl, ethyl, n-propyl, i-propyl, n-butyl, 2-butyl, t-butyl, pentyl or hexyl, most preferably ethyl; N is nitrogen atom; O is oxygen atom; and C is carbon atom; preferably 4-[(ethoxycarbonyl)(methyl)amino]pentan-2-yl ethyl carbamate (AB-OEt).

In an embodiment, as internal donor an aminobenzoate compound according to Formula B is used:

Formula B

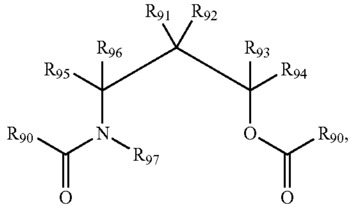

wherein each $R^{90}$ group is independently a substituted or unsubstituted aromatic group, preferably having between 6 and 20 carbon atoms; $R^{91}$, $R^{92}$, $R^{93}$, $R^{94}$, $R^{95}$, $R^{96}$ are each independently selected from a hydrogen or a hydrocarbyl group, preferably hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; O is oxygen atom; and C is carbon atom; preferably 4-[benzoyl(methyl)amino]pentan-2-yl benzoate (AB). More information about this internal electron donor an several embodiments can be found in in WO2014/001257 A1, which is incorporated by reference into the present application. The preparation of this donor is disclosed in WO2014/001257 A1. The Examples of this patent disclosing this donor preparation are incorporated by reference into the present application.

In an embodiment, the activator is added during stage I and the internal donor is added during stage III. In an embodiment, the activator is added during stage I and the internal donor is added during stages II and III and optionally IV. Preferably said activator being a monoester, and the internal donor being an aminobenzoate. In a specific embodiment the activator EB is added during stage I and AB is added during stage III. In a specific embodiment the activator EB is added during stage I and AB is added during stages II and III. In a specific embodiment the activator EB is added during stage I and AB is added during stages II and III and IV.

In an embodiment, as internal donor a 1,3-diether, preferably 9,9-bis(methoxymethyl)fluorene (Flu). More information about this internal electron donor and several embodiments can be found in in WO2015/091983 A1, which is incorporated by reference into the present application. An example of a 1,3-diether a 1,3-diether represented by the Formula C:

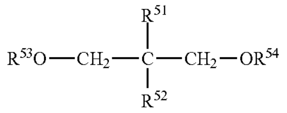

wherein $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof, and $R^{53}$ and $R^{54}$ are each independently a hydrocarbyl group, selected from e.g. alkyl, alkenyl, aryl, aralkyl, alkoxycarbonyl or alkylaryl groups, and one or more combinations thereof, preferably 9,9-bis(methoxymethyl)fluorene (Flu).

Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the IUPAC Periodic Table of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59, line 1 to page 60, line 30, which is incorporated here by reference.

External Electron Donor

The catalyst system according to the present invention preferably comprises an external electron donor. One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes. The Al/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 A1 and EP1783145 A1 disclose a Ziegler-Natta catalyst type comprising an organo-silicon compound as external donor that is represented by formula $Si(OR^c)_3(NR^dR^e)$, wherein $R^c$ is a hydrocarbon group having 1 to 6 carbon atoms, $R^d$ is a hydrocarbon group having 1 to 12 carbon atoms or hydrogen atom, and $R^e$ is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula $Si(OR^a)_{4-n}R^b{}_n$, imidosilanes according to Formula I ($R^a$ and $R^b$ as defined in WO2015091984 A1), alkylimidosilanes according to Formula I' as described on page 61, line 26 to page 67, line 8 which is incorporated here by reference. Alkoxy silane halide are used for preparing imidosilane and alkylimidosilane internal donors and are, respectively, according to Formula XXIVa: $Z_nSi(OR^{11})_{4-n}$ and Formula XXIVa: $Z_nSi(OR^{11})_{4-n-m}(R^{12})_m$ ($R^{11}$ and $R^{12}$ as defined in WO2015091984 A1). In the alkoxy silane halide represented by Formula XXIVa and XXIVb, Z is halogen group, and more preferably a chlorine group; n=1, 2 or 3; m=1 or 2. Specific examples regarding the external donor, considering Formula I' in WO2015091984 A1, are described in WO2015091984 A1 of the same applicant, page 67, lines 9-22, which is incorporated here by reference.

The additional compound(s) in the external donor according to the invention may be one or more alkoxysilanes, as described in WO2015091984 A1 of the same applicant, page 67, line 24 to page 69, line 4, which section is incorporated here by reference. In an embodiment, the silane compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to Formula IV (preferably n-propyl trimethoxysilane or n-propyl triethoxysilane) or cyclohexylmethyldimethoxysilane or another dialkyldialkoxysilane.

Catalyst System

The invention also relates to a process to make the catalyst system by contacting a Ziegler-Natta type procatalyst, a co-catalyst and optionally one or more external electron donors. The procatalyst, the co-catalyst and the external donor can be contacted in any way known to the skilled person in the art; and as also described herein, more specifically as in the Examples. The invention further relates to a process of preparing a polyolefin by contacting at least one olefin with a polymerization catalyst system comprising the procatalyst according to the present invention. Preferably, the polyolefin made by using the catalyst system of the present invention is a polypropylene. For instance, the external donor in the catalyst system according to the present invention can be complexed with the co-catalyst and mixed with the procatalyst (pre-mix) prior to contact between the procatalyst and the olefin. The external donor can also be added independently to the polymerization reactor. The procatalyst, the co-catalyst, and the external donor can be mixed or otherwise combined prior to addition to the polymerization reactor. Contacting the olefin with the catalyst system according to the present invention can be done under standard polymerization conditions, known to the skilled person. See for example Pasquini, N. (ed.) "Polypropylene handbook" $2^{nd}$ edition, Carl Hanser Verlag Munich, 2005. Chapter 6.2 and references cited therein.

Polymerization Process

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed or agitated bed of polymer particles). Polymerization in a slurry (liquid phase) as well as information about the polyolefins that are/may be prepared are described in WO2015091984 A1 of the same applicant, page 70, line 10 to page 71, line 23, which section is incorporated here by reference; information about gas-phase polymerization processes are as described in WO2015091984 A1 of the same applicant, page 71, line 25 to page 72, line 26, which is incorporated here by reference.

Olefin

The olefin according to the invention may be selected from mono- and di-olefins containing from 2 to 40 carbon atoms; see also WO2015091984 A1 of the same applicant, page 72, line 28 to page 73, line 5 which section is incorporated here by reference. Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, 1-butene, 1-hexene, 1-heptene, 1-octene.

Polyolefin

The present invention also relates to a polyolefin, preferably a polypropylene obtained or obtainable by a process, comprising contacting an olefin, preferably propylene or a mixture of propylene and ethylene with the procatalyst according to the present invention. More information about the polymers formed is disclosed WO2015091984 A1 of the same applicant, page 73, lines 6-23 and 25-34 and page 74, line 26 to page 75, line 24, which sections are incorporated here by reference entirely. The present invention also relates to a polyolefin, preferably a propylene-based polymer obtained or obtainable by a process as described herein above, comprising contacting propylene or a mixture of propylene and ethylene with a catalyst system according to the present invention. In one embodiment the present invention relates to the production of a homopolymer of polypropylene. Several polymer properties are discussed here.

Xylene soluble fraction (XS) is preferably from 0.5 wt % to 10 wt %, or at least 0.5 wt % or at least 1.0 wt. %. It is preferably at most 8 wt %, or at most 7 wt %. The production rate is preferably from 1 kg/g/hr to 100 kg/g/hr, or at least 20 kg/g/hr or at most 90 kg/g/hr. MFR is preferably from about 0.01 g/10 min to about 2000 g/10 min. It is preferably at least 0.01 g/10 min or at least 0.1 g/10 min. It is preferably at most 1000 g/10 min, or at most 500 g/10 min or at most 150 g/10 min, or at most 100 g/10 min.

Use of Polyolefin

The invention also relates to the use of the polyolefins, preferably the propylene-based polymers (also called polypropylenes) according to the invention in injection moulding, blow moulding, extrusion moulding, compression moulding, casting, thin-walled injection moulding, etc. for example in food contact applications. Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging applications both for food and non-food segments. This includes pails and containers and yellow fats/margarine tubs and dairy cups.

SPECIFIC EMBODIMENTS

Several specific embodiments are disclosed below. Three combinations of activator and internal electron donor are discussed below. A first combination of activator and internal electron donor is EB with AB.

Specific Embodiment 1

A process for the preparation of a procatalyst suitable for preparing a catalyst composition for olefin polymerization, said process comprising the steps of Step A) providing or preparing a butyl magnesium chloride Grignard compound;

Step B) contacting the a butyl magnesium chloride Grignard compound with TES to give a solid support;

Step C) activating said solid support, comprising two sub steps: step C1) a first activation step by contacting the solid support obtained in step B) with at least one first activating compound being TET; and step C2) a second activation step by contacting the partially activated solid support obtained in step C1) with ethyl alcohol;

Step D) adding to the activated solid support obtained step C) toluene as the solvent and $TiCl_4$, ethyl benzoate as activator prior to or simultaneous with the addition of AB as internal donor to obtain said procatalyst.

A second combination of activator and internal electron donor is EB with 4-[(ethoxycarbonyl)(methyl)amino]pentan-2-yl ethyl carbamate (AB-OEt).

Specific Embodiment 2

A process for the preparation of a procatalyst suitable for preparing a catalyst composition for olefin polymerization, said process comprising the steps of Step A) providing or preparing a butyl magnesium chloride Grignard compound;

Step B) contacting the a butyl magnesium chloride Grignard compound with TES to give a solid support;

Step C) activating said solid support, comprising two sub steps: step C1) a first activation step by contacting the solid support obtained in step B) with at least one first activating compound being TET; and step C2) a second activation step by contacting the activated solid support obtained in step C1) with ethyl alcohol;

Step D) adding to the activated solid support obtained step C) toluene and $TiCl_4$, ethyl benzoate as activator prior to or simultaneous with the addition of AB-OEt; to obtain said procatalyst.

A third combination of activator and internal electron donor is Ba-2Me with Flu.

Specific Embodiment 3

A process for the preparation of a procatalyst suitable for preparing a catalyst composition for olefin polymerization, said process comprising the steps of Step A) providing or preparing a butyl magnesium chloride Grignard compound;

Step B) contacting the a butyl magnesium chloride Grignard compound with TES to give a solid support;

Step C) activating said solid support, comprising two sub steps: step C1) a first activation step by contacting the solid support obtained in step B) with ethanol as second activating compound and thereafter at least one first activating compound being TET; and step C2) a second activation step by contacting the activated solid support obtained in step C1) with ethyl alcohol;

Step D) adding to the activated solid support obtained step C) toluene and $TiCl_4$, BA-2Me as activator prior to or simultaneous with the addition of Flu as internal donor to obtain said procatalyst.

The invention is now further elucidated by the following non-limiting examples.

EXAMPLES

Example 1

Step A) Preparation of the Solution of Butyl Magnesium Chloride

This step was carried out according to the procedure presented in Example III of EP1222214 B1. A stainless steel reactor having a volume of 16 liter was filled with 280 grams of magnesium powder. The reactor was brought under nitrogen. The magnesium was heated at 80° C. for 1 hour, after which a mixture of dibutyl ether (1.5 L) and n-chlorobutane (80 mL) was added. The temperature of the mixture was raised to 75° C. and iodine (0.7 g) was added to the reaction mixture. After the color of the iodine had disappeared, another mixture of dibutyl ether (10 L) and n-chlorobutane (1.1 L) was slowly added over a period of 3 hours. The temperature of reaction mixture was kept between 76 and 78° C. The reaction mixture was stirred for another 4 hours at a temperature of 76° C. Then the stirring and heating were stopped and the solid material was allowed to settle for 48 hours. The solution above the solid material was removed by decanting, by which a solution of butyl magnesium chloride in dibutyl ether (product A) with a concentration of 0.86 mol Mg/L was obtained.

Step B) Preparation of the Solid Support

The reagents during support preparation were pre-mixed, prior to addition, by using a minimixer equipped a stirrer and jacket as presented in Example I of EP1222214 B1. The volume of the minimixer was 3.0 mL and the volume of line between the minimixer and the reactor was 0.6 mL. The premixing time was approximately 9.3 seconds. A stainless steel reactor with a volume of 16 liters was equipped with a blade stirrer, two baffles and a jacket. The reactor was filled with 4 L of dibutyl ether. The temperature in reactor was set at 35° C. and a stirring speed of 115 rpm was used. The temperature in the minimixer was set at 3° C. and a stirring speed of 1000 rpm was used. The product of step A), being a solution of product A (6.8 L, 5.85 mol Mg), and a solution of 979 mL TES in 1060 mL of dibutyl ether were both cooled to 3° C. and then were dose simultaneously through the minimixer into the reactor. This allows pre-mixing of the product A and TES solutions. The dosing time into the reactor was 340 minutes. The stirring speed in the reactor was 115 rpm at the beginning of the dosing and was gradually increased up to 160 rpm at the end of dosing stage. Once the dosing was complete, the reaction mixture was heated up to a temperature of 60° C. during a heating period of 30 minutes and was kept at this temperature for 1 hour. Then the stirring was stopped and a solid substance was allowed to settle. The supernatant was removed by decanting. The solid substance was washed four times using 8 L of heptane per washing. A white solid substance (product B), the solid support, was obtained in suspended form in 2 L of heptane. The average particle size of support was 17.3 μm and the SPAN value (d90-d10)/d50 was 0.62.

Step C) Activation of Support

The solid support (product B) was activated using a first activating compound—TET—and a second activating compound being an activating electron donor—ethanol (EtOH)—via the following two stage procedure. First, the suspension of product B obtained in step B) comprising 600 grams of the solid support was entered in a 16 liter stainless steel reactor and was diluted by heptane up to a volume of 10 liter. The stirrer speed in the reactor was set to 150 rpm and the reactor was cooled to a temperature of 10° C. Then, 600 mL of a solution of 28.8 mL of ethanol in 571.2 mL of heptane was slowly dosed into the reactor during a period of 60 min at a temperature of 10° C. The molar ratio of ethanol to magnesium (EtOH/Mg) was 0.1. After the dosing was completed, the reaction mixture was kept at a temperature of 10° C. for a period of 30 minutes. Then 600 mL of a solution of 102 ml TET in heptane was added with a molar ratio of TET over magnesium (TET/Mg) of 0.1 at a temperature of 10° C. during a period of 1 hour. Then, the slurry was heated up to a temperature of 30° C. during a heating period of 30 minutes and kept at that temperature for a period of 120 minutes. Then, mixing was stopped and a solid was allowed to settle after which the supernatant liquid was decanted. The solid reaction product obtained was washed once with 7 L of heptane. After that 10 L of heptane was added to reactor and the reaction product was cooled to a temperature of 15° C. Subsequently, 800 mL of solution of 86.5 mL of ethanol in 713.5 mL of heptane, with a molar ratio of ethanol over magnesium of 0.3 was dosed at a temperature of 15° C. during a dosing period of 60 minutes. After that the slurry was heated to a temperature of 30° C. during a heating period of 30 min and kept at that temperature during a period of 120 minutes. Subsequently, the stirring was stopped and a solid was allowed to settle and the supernatant liquid was decanted. The solid product (product C), being the activated solid support, was washed once with 7 L of heptane.

Step D) Preparation of the Catalyst

Stage I: A glass reactor with a volume of 0.3 L was brought under nitrogen atmosphere and then 100 ml of titanium $TiCl_4$ was added into the reactor. A suspension of 5 grams of the activated solid support obtained in step C) in 15 mL of heptane was added into the reactor under stirring. The reaction mixture was kept at a temperature of 20° C. for a period of 60 minutes. Then the reaction mixture was heated to a temperature 105° C. for a heating period of 60 minutes. During the first 15 minutes, when the temperature rises from 20 to approximately 50° C., a solution of 1.58 grams of EB in 3 mL of toluene with an EB to magnesium molar ratio of 0.3 was dosed into the reactor. After dosing was completed the reaction mixture was stirred at a temperature of 105° C. for a period of 90 minutes. Then the stirring was stopped and a solid substance was allowed to settle. The supernatant was removed by decanting, after which the solid product was washed once with 120 mL of toluene at 100° C. for a washing period of 20 minutes. Then the washing solution was removed by decanting.

Stage II: a mixture of 60 mL $TiCl_4$ and 60 mL of toluene was added to the solid product obtained in stage I. The reaction mixture was heated to 105° C. after which a solution of 0.57 gram of AB in 3 mL of toluene was added, with a AB to magnesium molar ratio of 0.05. The reaction mixture was stirred at a temperature of 105° C. for a period of 60 minutes. Then, stirring was stopped and a solid substance was allowed to settle. The supernatant was removed by decanting.

Stage III: A solution of 0.51 gram of AB in 3 ml of toluene was added to the solid obtained in stage II, with a AB to magnesium molar ratio of 0.045. The reaction mixture was stirred at a temperature of 105° C. for a period of 60 minutes. Then, stirring was stopped and a solid substance was allowed to settle. The supernatant was removed by decanting. After that a mixture of 60 mL of $TiCl_4$ and 60 mL of toluene was added and the reaction mixture was stirred at a temperature of 105° C. for a period of 30 minutes. After that, the stirring was stopped and a solid substance was allowed to settle. The supernatant was removed by decanting and the solid obtained was washed five times using 150 mL of heptane at a temperature of 60° C. during each washing. A procatalyst was obtained.

Step E) Polymerization of Propylene

Polymerization of propylene was carried out in a stainless steel reactor with a volume of 0.7 L in 300 mL of heptane at a temperature of 70° C. with a total pressure of 0.7 MPa and a hydrogen presence of 55 mL for a period of 60 minutes in the presence of a catalyst system comprising: i) the procatalyst obtained in step D), triethylaluminium (TEAL) as a co-catalyst and cyclohexylmethyldimethoxysilane (C-donor) as external electron donor. The concentration of the procatalyst component was 0.023 g/L; the concentration of TEAL was 4.0 mmol/L and the concentration of C-donor was 0.2 mmol/L. Data on the catalyst performance at propylene polymerization are presented in Table 1 below.

Example 2

Steps A), B), C) and E) were carried out as described in Example 1. Step D) was carried out as disclosed below.

Step D) Preparation of the Catalyst

This step was carried out as described in Example 1, except that the duration of the stirring time after each addition of $TiCl_4$ and toluene and after addition of AB was 100 minutes instead of the times of either 60 or 30 minutes according to Example 1. Data on the catalyst performance at propylene polymerization are presented in Table 1 below.

Comparative Example 1 (CE1)

Steps A), B), C) and E) were carried out as described in Example 1. Step D) was carried out as disclosed below.

Step D) Preparation of the Catalyst

This step was carried out as described in Example 1, except that chlorobenzene was used as solvent instead of toluene during all stages of catalyst preparation; the same amounts of solvent are used. Data on the catalyst performance at propylene polymerization are presented in Table 1 below.

Comparative Example 2 and 3(CE2 CE3)

Steps A), B), C) and E) were carried out as described in Example 1. Step D) was carried out as disclosed below.

Step D) Preparation of the Catalyst

This step was carried out as described in Example 1, except that heptane was used as solvent instead of toluene during all stages of catalyst preparation; the same amounts of solvent are used. Data on the catalyst performance at propylene polymerization are presented in Table 1 below.

TABLE 1

Results.

| Ex. | Solvent step D) | Procatalyst (wt. %) Ti | Procatalyst (wt. %) Donor | Yield (kg/g cat.) | XS (wt. %) | BD (g/L) | SPAN[1] | MFR, (g/10 min) |
|---|---|---|---|---|---|---|---|---|
| Ex. 1 | toluene | 3.3 | 4.3 EB 15.7 AB | 11.2 | 2.2 | 454 | 0.6 | 1.3 |
| Ex. 2 | toluene | 3.1 | 4.5 EB 13.0 AB | 10.8 | 2.8 | 459 | 0.5 | 1.1 |
| CE1 | chloro-benzene | 3.5 | 2.8 EB 12.7 AB | 11.2 | 2.3 | 448 | 0.6 | 0.7 |
| CE2 | heptane | 2.9 | 3.1 EB 14.5 AB | 11.9 | 2.6 | 449 | 0.5 | 0.72 |
| CE3 | heptane | 3.3 | 4.3 EB 15.7 AB | 10.5 | 3.2 | 488 | 1.0 | 0.7 |

[1]Data of sieve analysis

Table 1 shows that the catalysts prepared according to process of the invention using toluene as a solvent have a surprisingly higher MFR value (1.1-1.3 versus 0.7 g/10 min), which is desirable. Table 1 further shows that the catalysts prepared according to process of the invention using toluene as a solvent have a surprisingly higher content of internal donor; the inventive process therefore provides a more efficient use of internal donor which is environmentally and economically desirable, whilst maintaining high activity and high PP bulk density and narrow SPAN. Further, toluene is a safer solvent environmentally than chlorobenzene.

The invention claimed is:

1. A process for the preparation of a procatalyst suitable for preparing a catalyst composition for olefin polymerization, said process comprising the steps of Step A) providing or preparing a compound $R^4_zMgX^4_{2-z}$ wherein:

$R^4$ is independently a linear, branched or cyclic hydrocarbyl group independently selected from alkyl, alkenyl, aryl, aralkyl, or alkylaryl groups, and one or more combinations thereof; wherein said hydrocarbyl group is substituted or unsubstituted, and optionally contains one or more heteroatoms;

$X^4$ is independently fluoride ($F^-$), chloride ($Cl^-$), bromide ($Br^-$) or iodide ($I^-$); and z is in a range of larger than 0 and smaller than 2, being $0<z<2$;

Step B) contacting the compound $R^4_zMgX^4_{2-z}$ with a silane compound $Si(OR^5)_{4-n}(R^6)_n$ to give a solid support comprising $Mg(OR^1)_xX^1_{2-x}$ wherein:

$R^1$, $R^5$ and $R^6$ are each independently a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contains one or more heteroatoms;

$X^1$ is independently fluoride ($F^-$), chloride ($Cl^-$), bromide ($Br^-$) or iodide ($I^-$);

n is in range of 0 to 4; and x is in a range of larger than 0 and smaller than 2, being $0<x<2$;

Step C) activating the solid support by contacting the solid support obtained in step B) with either at least one activation electron donor or with at least one first activating compound being a metal alkoxide or a metalloid alkoxide compound of formula $M^1(OR^2)_{v-w}(OR^3)_w$ or $M^2(OR^2)_{v-w}(R^3)_w$; wherein:

$M^1$ is a metal or a metalloid selected from Ti, Zr, Hf, Al and Si;

$M^2$ is Si;

v is the valency of $M^1$ or $M^2$;

w is smaller than v;

$R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contains one or more heteroatoms;

and a second activating compound being an activating electron donor; to obtain an activated solid support; and Step D) adding to the activated solid support obtained in step C) toluene, a transition metal halide and at least one internal electron donor, and optionally also the addition of an activator prior to or simultaneous with the addition of an internal donor, and reacting to obtain the procatalyst;

wherein step C) of activating the solid support, comprising two sub steps:

Step C1) a first activation step of partly activating the solid support by contacting the solid support obtained in step B) with a second activating compound being an activating electron donor and with at least a first activating compound being a metal alkoxide or a metalloid alkoxide compound of formula $M^1(OR^2)_{v-w}(OR^3)_w$ or $M^2(OR^2)_{v-w}(R^3)_w$; wherein $M^1$ is a metal or a metalloid of Ti, Zr, Hf, Al or Si; $M^2$ is Si; v is the valency of $M^1$ or $M^2$; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, and optionally contains one or more heteroatoms;

and step C2) a second activation step by contacting the partly activated solid support obtained in step C1) with an activating electron donor to obtain an activated solid support.

2. The process according to claim 1, wherein step D) comprises the following stages:

D-I) a first stage of contacting the activated solid support obtained in step C2) with a halogen-containing Ti compound, optionally an activator and optionally at least a portion of an internal donor;

D-II) a second stage of contacting the product obtained in step D-I) with a halogen-containing Ti compound, and optionally at least a portion of an internal electron donor;

D-III) a third stage of contacting the product obtained in step D-II) with a halogen-containing Ti compound, and optionally at least a portion of an internal electron donor;

D-IV) optionally a fourth stage of contacting the product obtained in step D-III) with a halogen-containing Ti compound, and optionally at least a portion of an internal electron donor;

wherein said internal electron donor is added during at least one of the stages D-I, D-II, D-III, and D-IV.

3. The process according to claim 1, wherein as the metal alkoxide activating compound in step C1) titanium tetraethoxide (TET) is used and wherein ethanol as activating electron donor is used in step C1) as second activating compound and wherein during step C2) ethanol is used as activating electron donor.

4. The process according to claim 1, wherein as activator one of the following is used: i) a monoester, optionally selected from the group consisting of butyl formate, ethyl acetate, amyl acetate, butyl acetate, ethyl acrylate, methyl methacrylate, isobutyl methacrylate, ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate; or ii) a benzamide according to formula X:

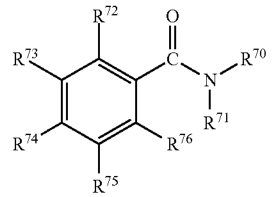

wherein $R^{70}$ and $R^{71}$ are each independently hydrogen or an alkyl, and $R^{72}$, $R^{73}$, $R^{74}$, $R^{75}$, $R^{76}$ are each independently hydrogen, a heteroatom, or a hydrocarbyl group selected from alkyl, alkenyl, aryl, aralkyl, alkoxycarbonyl or alkylaryl groups, and one or more combinations thereof.

5. The process according to claim 1, wherein as internal donor one of the following is used:

i) a carbonate-carbamate compound according to Formula A:

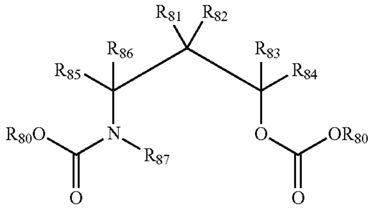

wherein: $R^{81}$, $R^{82}$, $R^{83}$, $R^{84}$, $R^{85}$, and $R^{86}$ are the same or different and are independently hydrogen or a linear, branched or cyclic hydrocarbyl group selected from alkyl, alkenyl, aryl, aralkyl, or alkylaryl groups, and one or more combinations thereof; $R^{87}$ is a hydrogen or a linear, branched or cyclic hydrocarbyl group, selected from alkyl, alkenyl, aryl, aralkyl, alkoxycarbonyl or alkylaryl groups, and one or more combinations thereof; each $R^{80}$ group is independently a linear, branched or cyclic hydrocarbyl group selected from alkyl, alkenyl, aryl, aralkyl, or alkylaryl groups, and one or more combinations thereof; N is nitrogen atom; O is oxygen atom; and C is carbon atom; or (ii) an aminobenzoate compound according to Formula B:

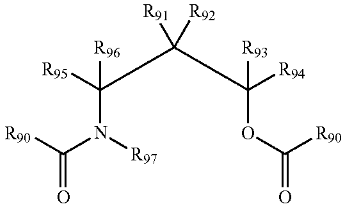

wherein each $R^{90}$ group is independently a substituted or unsubstituted aromatic group; $R^{91}$, $R^{92}$, $R^{93}$, $R^{94}$, $R^{95}$, and $R^{96}$ are each independently a hydrogen or a linear, branched or cyclic hydrocarbyl group selected from alkyl, alkenyl, aryl, aralkyl, or alkylaryl groups, and one or more combinations thereof; $R^{97}$ is a hydrogen or a linear, branched or cyclic hydrocarbyl group selected from alkyl, alkenyl, aryl, aralkyl, alkoxycarbonyl or alkylaryl groups, and one or more combinations thereof; N is a nitrogen atom; O is an oxygen atom; and C is a carbon atom; or iii) a 1,3-diether represented by the Formula C:

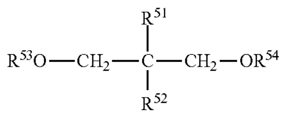

wherein $R^{51}$ and $R^{52}$ are each independently a hydrogen or a hydrocarbyl group selected from alkyl, alkenyl, aryl, aralkyl, alkoxycarbonyl or alkylaryl groups, and one or more combinations thereof, and $R^{53}$ and $R^{54}$ are each independently a hydrocarbyl group selected from alkyl, alkenyl, aryl, aralkyl, alkoxycarbonyl or alkylaryl groups, and one or more combinations thereof.

6. The process according to claim 1, wherein during step D) N,N-dimethyl benzamide is added as activator and 9,9-bis(methoxymethyl)fluorene is added as internal donor or wherein during step D) ethyl benzoate is added as activator and wherein-[(ethoxycarbonyl)(methyl)amino]pentan-2-yl ethyl carbamate or 4-[benzoyl(methyl)amino]pentan-2-yl benzoate is added as internal donor.

7. The process according to claim 2, wherein the internal electron donor is added in multiple portions during two stages of step D).

8. A procatalyst directly obtained by the process according to claim 1.

9. A catalyst system comprising a procatalyst according to claim 8, a co-catalyst and optionally an external electron donor.

10. A process for the preparation of polyolefins comprising contacting the catalyst system of claim 9 with at least one olefin.

11. The process according to claim 2, wherein the internal electron donor is added in two portions during two stages of step D), and the amount of internal donor is split between these two portions in a weight ratio of from 80%:20% to 20%:80%.

12. The process according to claim 2, wherein the internal electron donor is added in three portions during three stages of step D), and wherein the amount of internal donor is split between these three portions in a weight ratio of from 20% to 40% for each portion, wherein the total of the three portions is 100%.

13. The process according to claim 4, wherein the activator is at least one of ethyl acetate, ethyl benzoate, benzoyl chloride, ethyl p-bromobenzoate, n-propyl benzoate, and benzoic anhydride, benzamide, N-methyl benzamide, or N,N-dimethyl benzamide.

14. The process according to claim 5, wherein the internal donor is 4-[(ethoxycarbonyl)(methyl)amino]pentan-2-yl ethyl carbamate; 4-[benzoyl(methyl)amino]pentan-2-yl benzoate; or 9,9-bis(methoxymethyl)fluorene.

15. The process according to claim 1, wherein:

$R^4$ has from 1 to 20 carbon atoms;

$R^1$ is the same as $R^5$;

$X^1$ is the same as $X^4$;

n is less than 4;

X is the same as z;

Step C) comprises activating the solid support by contacting the solid support obtained in step B) with at least one first activating compound being a metal alkoxide or a metalloid alkoxide compound of formula $M^1(OR^2)_{v-w}(OR^3)_w$ or $M^2(OR^2)_{v-w}(R^3)_w$;

$R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, optionally contains one or more heteroatoms, and has from 1 to 20 carbons; and the transition metal halide in Step D is a halogen-containing Ti compound.

* * * * *